United States Patent Office 3,368,922
Patented Feb. 13, 1968

3,368,922
POLYELECTROLYTE MEMBRANE COMPRISING A COPOLYMER INCLUDING ACRYLONITRILE AND FUEL CELL WITH SAME
Ival O. Salyer, Dayton, Ohio, assignor to Monsanto Research Corporation, St. Louis, Mo., a corporation of Delaware
No Drawing. Filed Oct. 26, 1962, Ser. No. 233,425
19 Claims. (Cl. 136—86)

This invention relates to polymeric, membranous polyelectrolytes and fuel cells in which such electrolytes are employed.

According to the invention there are provided solid, membranous polyelectrolytes by molding under pressure, in the presence of a free radical liberating agent a polymeric material selected from the class consisting of (I) a copolymer of an aliphatic mono-olefinic hydrocarbon of from 2 to 4 carbon atoms and an acrylic compound which may be an alkyl acrylate having from 1 to 4 carbon atoms in the alkyl radical or acrylonitrile and (II) a mixture consisting of at least 50% by weight of (I) with the balance being a copolymer of said olefinic hydrocarbon and a vinyl alkanoate of from 4 to 6 carbon atoms, the quantity of said free-radical liberating agent being from 0.5% to 15% by weight of the polymeric material, and hydrolyzing the molded product. The molding mixture may or may not contain carbon black as a reinforcing filler in a quantity of up to 30% by weight of the polymeric material.

Useful copolymers of the type I above are the copolymers of olefins such as ethylene, propylene, 2-butene, or isobutene or mixtures of the same and one or more alkyl acrylates such as methyl, ethyl, propyl, isopropyl, sect-butyl or tert-butyl acrylate. The olefinic hydrocarbon content of the copolymer will be from 15% to 85%, and preferably from 30% to 80% by weight of the copolymer. Useful copolymers of type (II) are copolymers of the same olefins and vinyl acetate, vinyl propionate or vinyl butyrate, wherein the olefin content is also from 15 to 85% and, preferably from 30% to 80% by weight of the copolymer. A terpolymer prepared from an olefin, a vinyl alkanoate and an alkyl acrylate, e.g., from ethylene, vinyl acetate and methyl acrylate, in a weight ratio of, say, 40:50:10, may also be used. The copolymers may or may not be partially hydrolyzed previous to molding.

The copolymer is compression molded and cured in presence of a free-radical liberating agent. Such an agent may be a peroxidic compound, e.g., an acyl peroxide such as acetyl, benzoyl, lauroyl, or stearoyl peroxide; a hydrocarbon peroxide or hydroperoxide such as di-tert-butyl peroxide, di-tert-amyl peroxide, dicumyl peroxide, tert-butyl hydroperoxide, 2,5 - dimethyl-2,5-di(tert-butyl-peroxy)hexane, 2,5 - dimethyl-2,5-di-(tert-butylperoxy)-hexyne-3cumene hydroperoxide, or p-cymene hydroperoxide; and inorganic per-compounds such as hydrogen peroxide, sodium peroxide, sodium perborate, potassium persulfate, and alkali percarbonates; the azo type catalysts, e.g., α,α' - azodiisobutyronitrile, dimethyl α,α' - azodi-isovalerate or α,α'-azodiisobutyramide; organometallic compounds such as tetraethyl lead, p-quinone dioxime, polymeric di-nitrosobenzene, etc.

The molding mixture may also contain pulverulent carbon black as reinforcing filler. Any of the commercially available furnace process blacks, channel process blacks, thermal process blacks or lampblack process blacks are useful. The rubber-grade reinforcing carbon blacks which have a mean particle size of from about 20 to 85 millimicrons are conveniently used owing to ease in availability. Of these may be mentioned such trade-named carbon blacks as Kosmos, Sterling, Dixie, Witco, etc. The carbon blacks may or may not be electrically conductive. The chief function of the carbon black is to increase the mechanical properties of the membrane rather than to decrease electrical resistivity. At the concentrations at which mechanical strength is improved, i.e., at a quantity of up to 25%, and preferably of from 5% to 20% by weight of the polymer, there is very little, if any, effect on resistivity of the membrane.

Conventional molding techniques are useful. Generally, the molding mixture is simultaneously molded and cured between polished press plates at a temperature of from 50–200° C., preferably 100–175° C., for a time of one minute to several hours, preferably for 15 minutes to one hour, and at a pressure of say 100 to 10,000 p.s.i.

The molded membrane is hydrolyzed in order to convert the ester groups of the olefin-acrylate copolymer component into free carboxy radicals. When the membrane has been prepared from a mixture which also includes the olefin-vinyl alkanoate copolymer, the hydrolyzed membrane contains free carboxy radicals obtained by hydrolysis of the acrylate radicals and free hydroxy groups obtained by hydrolysis of the ester groups of the vinyl alkanoate. The hydrolysis may be effected by allowing the molded membrane to stand in aqueous and/or alcoholic alkali metal oxide, hydroxide or carbonate or inorganic or organic acids at ordinary or increased temperature, say, at from 15° C. to 100° C., until hydrolysis of substantially all of the ester radicals has occurred. Useful alkaline materials for effecting the hydrolysis are sodium, potassium, lithium or rubidium oxide, hydroxide or carbonate in water and/or in a lower alcohol of from 1 to 4 carbon atoms e.g., methanol, propanol, ethanol or butanol or a mixture of alcohols such as a mixture of methanol and isopropanol. When effecting hydrolysis with an acidic agent there may be employed aqueous and/or alcoholic solutions of mineral acids such as hydrochloric, sulfuric or phosphoric acid or organic acids such a p-toluene-sulfonic acid, acetic acid or benzoic acid.

The presently provided hydrolyzed membranes are tough, stable, rigid structures which are generally useful as inter-electrode separators for electrochemical cells, e.g., galvanic cells, dry cells and batteries, and in any apparatus wherein there occurs a transfer of ions from one solution to another across permeable diaphragms or barriers which separate the solutions. The present membranes are particularly useful as membranous polyelectrolytes in fuel cells.

The present invention thus provides a fuel cell comprising a pair of spaced electrodes in electrical contact with each other through a solid membraneous polyelectrolyte interposed between said electrodes. Gaseous or liquid reductants and oxidants may be used as the fuel components of the cell and there may or may not be present a liquid polyelectrolyte which may be substantially neutral, alkaline or acidic.

The present polymeric, membraneous structures are particularly useful in the types of fuel cells which are described in the C. N. Satterfield et al. copending applications Ser. Nos. 108,242, 108,270 and 108,272, all filed May 8, 1961, which disclose and claim fuel cells employing an aqueous oxidizing agent as oxidant and a fuel which is either hydrazine or hydrazine hydrate, ammonia or ammonium hydroxide or a lower alkanol.

The oxidant may be an aqueous solution of nitric acid, persulfuric acid, perphosphoric acid, the sodium, potassium or lithium salts of such acids, hydrogen peroxide and the water-soluble alkali or alkaline earth metal chromates, polychromates, perborates, dimolybdates or permanganates, vanadium pentoxide, chromic trioxide molybdenum pentoxide, etc. However, the presently provided membrane is also useful in fuel cells where either one or both of the reactants are gaseous, e.g., the fuel may be hydrogen or a gaseous hydrocarbon such as methane or propane and the oxidizing agent may be an oxygen containing gas such as air or nitric oxide or an aqueous solution of an inorganic oxidizing agent.

Depending upon the kind of reductant and oxidant there is also generally employed in the fuel cell an aqueous electrolyte which may be basic, acidic, or neutral. Aqueous solutions of alkali metal or alkaline earth metal hydroxides or carbonates are useful when there is desired an electrolyte having a pH of at least 7; and aqueous solutions of mineral acids such as sulfuric acid are useful when it is desired that the electrolyte be acidic. When there is employed a basic fuel, e.g., hydrazine or ammonium hydroxide, the aqueous electrolyte should not be acidic; with fuels such as hydrogen or ethanol the acidic aqueous electrolytes are advantageously used.

Both electrodes may be cylindrical or rectangular bars or plates of plain or porous structure which may be of carbon pressed and molded metallic particles or powdered metals, e.g., nickel, platinum, silver, gold, cadmium, Raney nickel-aluminum alloy, magnesium, zinc or silicon. Advantageously, they may comprise a carrier skeleton, e.g., of carbon, sintered stainless steel, fritted glass, or metal gauze, having coated thereupon or imbedded therein, catalysts such as palladium, gold, platinum, silver or iridium. The requirement that the cell be stable over long periods of time excludes, of course, electrode materials which are known to be attacked by reactants, reaction products, electrolytes, etc. When the electrolyte is a neutral salt, particular care must be directed to the selecttion of electrode material which is not attacked by the ionized salt. For example, since the chloride ion reacts with even those metals which are usually considered to be inert, chlorides are generally of little utility as electrolytes in fuel cells which employ metal electrodes. Chloride electrolytes may be used with inert materials such as carbon.

The electrodes may be conveniently hollowed for easy introduction of the fuel and oxidant into the cell. Thereby these components diffuse through the porous electrode structure to the electrode surface where reaction takes place. However, the fuel and the oxidant may also be mechanically impinged upon the electrode surface. Conveniently, also, the fuel and the oxidant may be dissolved in the aqueous electrolyte and the resulting solutions of electrolyte and reactant may be added at the respective electrodes while removing excess aqueous electrolyte from the cell. This expedient permits maintenance of the electrolyte at substantially constant concentrations in the cell while facilitating ion transport.

While the choice of electrode will depend to some extent upon the nature of the reductant and of the oxidant, generally the conventional carbon or nickel-aluminum alloy electrodes serve satisfactorily as either anodes or cathodes. While improvement in current output usually can be obtained by coating or impregnating such electrodes with catalysts known to promote oxidation and reduction reactions such as platinum, silver, palladium, etc., judicious choice of catalyst is again controlled by factors such as nature of reactants, rate of feed, proportion of fuel to oxidant, etc., which factors can be arrived at by routine experimentations and are not controlling upon the present invention.

The invention is further illustrated by, but not limited to, the following examples:

*Example 1*

A 40:60 weight ratio ethylene-methyl acrylate copolymer was mixed with 1% of dicumyl peroxide on cold mill rolls until thoroughly homogenized and a 20 g. sample of the resulting mixture was simultaneously molded and cured between polished press plates for 15 minutes at 100° C. and 45 minutes at 150° C. at from 300 p.s.i. to 3000 p.s.i. to give a rubbery membrane.

The membrane thus obtained was soaked for two days at room temperature in a 1 N potassium hydroxide solution in a 50:50 by volume mixture of methanol and isopropanol. The hydrolyzed membrane was then dried at 50° C. for 4 hours, washed first with 0.1 N aqueous hydrochloric acid and then with distilled water to remove any surface salt, and finally air-dried. The rubbery membrane was then evaluated for electrical resistivity by measuring the electrical resistance thereof using a meg ohm bridge and employing two pairs of 4" long copper electrodes spaced 4" apart and on opposite sides of a 4" x 4" sample of the membrane. There was thus obtained a volume resistivity of $2.4 \times 10^4$ ohms and testing of the surface resistivity gave $1.1 \times 10^5$ ohms/square for the hydrolyzed membrane, as compared to a volume resistance of $3.8 \times 10^8$ and a surface resistance of $2 \times 10''$, the similarly obtained values for the unhydrolyzed membrane.

*Example 2*

A 45:55 weight ratio ethylene-methyl acrylate copolymer was mixed with 10% by weight of dicumyl peroxide and simultaneously molded and cured between lubricated, polished press plates for a total of 1 hour, at a temperature of 150° C. During the cure the pressure was increased stepwise from an initial value of 120 p.s.i., to a final pressure of about 600 p.s.i., said pressure increase being at the rate of about 60 p.s.i. per five minute interval until the final total pressure was reached. When the final 600 p.s.i. pressure was reached, the sample was then held at this value for the remainder of the 1 hour curing cycle. The flexible molded film obtained by this procedure was then soaked for 5 days in 2.5 N alcoholic potassium hydroxide at room temperature, then washed with distilled water and dried. Using a Hathaway Model C-6B Resistance Meter in the testing procedure of Example 1, there was obtained a volume resistivity value of $1.8 \times 10^2$ ohms for the hydrolyzed membrane.

*Example 3*

A 40:60 weight ratio ethylene-methyl acrylate copolymer was hydrolyzed in toluene solution with alcoholic potassium hydroxide until all of the carboxylate groups had been hydrolyzed, then acidified to pH 7.0 with HCl and washed with distilled water and dried. The ethylene-acrylic acid polymer thus obtained was mixed with 1% of dicumyl peroxide and simultaneously molded and cured as in Example 1 to give a rubbery membrane. The membrane thus obtained was found to have a volume resistance of $1.5 \times 10^3$ ohms and a surface resistance of $5.2 \times 10^5$ ohms/square when tested by the procedure of Example 1, using a meg ohm bridge for values above $10^5$ ohms and an ohmmeter for values below this. It was used as fuel cell diaphragm as described in Example 7, wherein it is designated as membrane 3–A.

That additional hydrolysis after the curing and molding further lowers the surface resistance was shown by the fact that soaking the above membrane in a 1 N potassium hydroxide solution in a 1:1 methanol-isopropanol mixture, washing with aqueous hydrochloric acid and water and drying, there was obtained a volume resistance of $4.0 \times 10^2$ ohms and a surface resistance value of $5.0 \times 10^4$ ohms/square, as measured by a voltmeter using the procedure of Example 1.

*Example 4*

A 40:60 weight ratio ethylene-methyl acrylate copolymer was hydrolyzed in toluene solution with alcoholic potassium hydroxide until 12% of the carboxylate radicals of the copolymer had been hydrolyzed. The resulting washed and dried product was mixed on the rolling mill with 1% by weight of dicumyl peroxide and simultaneously molded and cured as in Example 1 to give a rubbery membrane. The membrane was then soaked for 2 days at room temperature in 1 N potassium hydroxide dissolved in a 50:50 volume mixture of methanol and isopropanol, subsequently heated for 4 hours at 50° C., washed with dilute hydrochloric acid and water, and finally dried. Testing of the electric resistivity of the dried membrane by the procedure of Example 1 gave a volume resistivity value of $1.2 \times 10^4$ ohms and a surface resistivity of $7.0 \times 10^5$ ohms/square.

*Example 5*

An 80:20 weight ratio ethylene-methyl acrylate copolymer was mixed on the rolling mill with 5% of dicumyl peroxide and the resulting mixture was simultaneously cured and molded into a membrane between lubricated, press polished plates for 60 minutes at 150° C. The resulting membrane was then maintained for 5 days at room temperature in 2.5 N (alcoholic) potassium hydroxide. The membrane, which now consisted essentially of the potassium salt of ethylene-acrylic acid copolymer was found to have a volume resistivity of $9.8 \times 10^4$ ohms when tested by the procedure of Example 1, using a Hathaway Model C-6B Resistance Meter.

The hydrolyzed film prepared above was subsequently soaked for 20 days at room temperature in 5 N aqueous potassium hydroxide. At the end of this time, the still strong and pliable film showed a volume resistance of $1.6 \times 10^3$ ohms when tested by the procedure of Example 1 using a Hathaway Model C-6B Resistance Meter.

*Example 6*

A 40:60 mole ratio of ethylene-acrylonitrile copolymer was thoroughly mixed with 5% by weight of dicumyl peroxide and simultaneously cured and molded into a film as in Example 1. Hydrolysis of the film was effected by maintaining it in 2.5 N alcoholic potassium hydroxide for 5 days at room temperature. After drying, the membrane, which consisted essentially of the potassium salt of ethylene-acrylic acid copolymer, was found to have a surface resistivity of $1.0 \times 10^5$ ohms/square when tested by the procedure of Example 1.

*Example 7*

This example shows testing of the membrane 3-A of Example 3 as a cation-exchange diaphragm in a fuel cell wherein hydrazine is used as reductant and aqueous nitric acid as oxidant.

The cell consisted of a "Lucite" (polymeric methyl methacrylate) cell block wherein there were centrally and perpendicularly positioned at a spaced distance from each other, a pair of electrodes which were prepared by treating, with a 3% aqueous chloroplatinic acid solution containing 0.3% lead acetate, the central 2 cm. x 3 cm. portions of 3 cm. x 3.5 cm. rectangles of 80 mesh, 0.003" wire screen of a 90:10 platinum-rhodium alloy. The membrane, which had been soaked in 1 M sodium nitrate for about 30 minutes, was interposed between the electrodes at a distance of 1/8" from each electrode, a rubber gasket of this thickness being set between the membrane and each electrode at the base of the assembly. As catholyte there was employed 7 ml. of 10 M nitric acid, and as anolyte there was employed 7 ml. of a 50:50 mixture of 5 M hydrazine and 5 M sodium hydroxide. The area faced by the screen electrodes was equal to the area of the solution-membrane interface. The cell was found to have an initial open circuit voltage of 2.08 volts, an average operating voltage of 0.9 volt at 50-32 milliamperes and a life of 10 hours. In the test, the cell was discharged first at constant current and then at constant external resistance.

*Example 8*

A 40:60 weight ratio ethylene-acrylate copolymer was milled with 1% by weight, based on the weight of the copolymer, of dicumyl peroxide for 5 minutes on steam-heated mill rolls. The resulting mixture was compression molded, using Teflon sheet as a spacer between said mixture and the press polish plates, for 15 minutes at 100° C. and 100 p.s.i. and 45 minutes at 150° C. and 1000 p.s.i. The resulting, rubbery membrane was hydrolyzed by soaking for 2 days in a 2.5 M solution of potassium hydroxide in a 50:50 volume mixture of methanol and isopropanol. The hydrolyzed membrane was found to have a volume resistivity of $6.4 \times 10^3$ ohms and a surface resistivity of $8.0 \times 10^3$ ohms/square, employing the procedure of Example 1 and using a meg ohm bridge for the first measurement and a voltmeter for the second.

Testing of the membrane in a fuel cell, employing the "Lucite" cell block and the electrodes described in Example 7, and spacing the present membrane between the electrodes in the same manner was conducted by employing 7 ml. of 10 M nitric acid as catholyte and 7 ml. of a 50:50 mixture of 5 M aqueous hydrazine and 5 M aqueous sodium hydroxide as anolyte. The cell was found to have an initial open circuit voltage of 2.0 volts and average operating voltage of 1.26 volts at 300 milliamperes.

*Example 9*

A mixture consisting of 50 parts by weight of a 40:60 weight ratio ethylene-methyl acrylate copolymer, 50 parts by weight of a 55:45 weight ratio ethylene-vinyl acetate copolymer and 1 part by weight of dicumyl peroxide was milled for 5 minutes on the steam-heated mill rolls and simultaneously molded and cured between lubricated press plates for 15 minutes at 100° C. and 45 minutes at 150° C. at from 300 to 3000 p.s.i. to give a rubbery membrane.

The membrane was then hydrolyzed by soaking it for 2 days at room temperature in a 2.5 N potassium hydroxide solution in a 50:50 by volume mixture of methanol and isopropanol. It was then washed with water and dried. Evaluation of the dried membrane for electrical resistivity as in Example 1 gave a volume resistivity of $1.6 \times 10^5$ ohms and a surface resistivity of $4.3 \times 10^5$ ohms/square.

The membrane was soaked for about an hour in an aqueous solution containing a 1 molar concentration of nitric acid and a 5-molar concentration of sodium nitrate and then tested for efficacy as a fuel cell diaphragm in the hydrazine-nitric acid fuel cell as described in Example 7. The cell was found to give an initial open circuit voltage of 2.02 volts and an average operating voltage of 1.00 volts at 300 milliamperes.

*Example 10*

This example is like Example 9 except that the molding composition contained a 75:25 weight ratio of the ethylene-methyl acrylate and ethylene-vinyl acetate copolymers instead of the 50:50 ratio of Example 9. After washing and drying, the resulting strong membrane was found to have a volume resistivity of $2.1 \times 10^5$ ohms and a surface resistivity of $4.8 \times 10^5$ ohms/square. In the fuel cell test there was obtained an initial open circuit voltage of 1.94 volts and an average operating voltage of 1.17 volts at 300 milliamperes.

*Example 11*

This example is like Example 9, except that the molding cmoposition consisted of 100 parts by weight of the ethylene-methyl acrylate copolymer and 1.0 part by weight of dicumyl peroxide. After washing and drying the volume resistivity of the membrane was found to be $6.4 \times 10^3$ ohms and the surface resistivity was found to be $8.0 \times 10^3$ ohms/square. In the fuel cell test there was obtained an initial open circuit voltage 2.00 volts and an average operating voltage of 0.94 volt at 300-242 milliamperes.

*Example 12*

A mixture consisting of 90 parts by weight of a 40:60 weight ratio ethylene-methyl acrylate copolymer and 10 parts by weight of a 55:45 weight ratio ethylene-vinyl acetate copolymer and 3 parts by weight of dicumyl peroxide was molded and hydrolyzed as in Example 9 to give a strong, rubbery film. The washed and dried film was found to have a surface resistivity of $9.5 \times 10^4$ ohms/sq.

*Example 13*

A mixture consisting of 90 parts by weight of a 45:55 weight ratio ethylene-methyl acrylate copolymer, 10 parts by weight of carbon black (Conductex SC, a low pH conducting black) and 5 parts by weight of dicumyl peroxide was molded between two platens using zinc stearate as a parting agent for a total of one hour at a temperature of 150° C., increasing the pressure during this time at five minute intervals from an initial total pressure of 6 tons to a final presure of 30 tons. The molded membrane was then cured for one hour at 150° C. The flexible film thus obtained was hydrolyzed by soaking it for 5 days in 2.5 N alcoholic potassium hydroxide at room temperature, then washed with distilled water and dried. Using a Hathaway model C-6B resistance meter in the testing procedure of Example 1, there was obtained a volume resistivity value of $5 \times 10^3$ ohms. Testing of the efficacy of the membrane, using the fuel cell apparatus described in Example 7, but employing 7 ml. of 15 M nitric acid as catholyte and, as anolyte, a mixture of 7 ml. of 17 M hydrazine and 2 g. of sodium hydroxide gave an initial voltage of 1.3 volts. After operation for 7.5 hours, the cell was delivering 0.91 volt at a current drain of 185 milliamperes. On the basis of reactants consumed, the power output was 39 watt-hrs./lb.

*Example 14*

This example is like Example 13, except that the molding mixture consisted of 80 parts by weight of the ethylene-methyl acrylate copolymer, 20 parts by weight of the carbon black and 5 parts by weight of dicumyl peroxide. The hydrolyzed, washed and dried membrane was found to have a volume resistivity of $4 \times 10^2$ ohms. Testing of the membrane, using the fuel cell apparatus described in Example 7 but employing 7 ml. of 15 M nitric acid as catholyte and, as anolyte, a mixture of 7 ml. of 17 M hydrazine and 2 grams of sodium hydroxide, gave an initial voltage of 1.52 volts and a voltage of 1.60 volts at 185 milliamperes at the end of 1.5 hours.

I claim:

1. A solid membraneous polyelectrolyte obtained by molding, at a temperature of from 50° C. to 200° C. and a pressure of 100 to 10,000 p.s.i. and in the presence of a peroxidic free-radical-liberating agent, a copolymer of an aliphatic mono-olefinic hydrocarbon of from 2 to 4 carbon atoms with acrylonitrile or with an alkyl acrylate having from 1 to 4 carbon atoms in the alkyl, said copolymer consisting from 15 to 85% by weight of the mono-olefinic hydrocarbon and said peroxidic agent being present in a quantity of from 0.5% to 15% by weight of the copolymer, and subsequently hydrolyzing the resulting molded product.

2. A fuel cell comprising a pair of spaced electrodes in electrical contact with each other through the membraneous polyelectrolyte of claim 1 interposed between said electrodes.

3. A fuel cell comprising a pair of spaced electrodes in electrical contact with each other through the membraneous polyelectrolyte of claim 1 interposed between said electrodes, one of said electrodes being continuously maintained in contact with a fuel selected from the class consisting of hydrazine and hydrazine hydrate, while the other of said electrodes is being continuously maintained in contact with an oxidizing agent selected from the class consisting of hydrogen peroxide, reducible inorganic oxides and oxy acids, and the alkali metal and the alkaline earth metal salts of said oxy acids.

4. The membraneous polyelectrolyte of claim 1, further limited in that the copolymer is the copolymer of said olefinic hydrocarbon and said alkyl acrylate.

5. The membraneous polyelectrolyte of claim 1, further limited in that the copolymer is the copolymer of ethylene and methyl acrylate.

6. The membraneous polyelectrolyte of claim 1, further limited in that the copolymer is the copolymer of said olefinic hydrocarbon and acrylonitrile.

7. The membraneous polyelectrolyte of claim 1, further limited in that said copolymer is present in admixture with carbon black in a quantity of up to 20% by weight of the copolymer.

8. The membraneous polyelectrolyte of claim 1, further limited in that the hydrolysis is conducted by treatment of the molded product with alkali hydroxide.

9. The membraneous polyelectrolyte of claim 1, further limited in that the copolymer is the copolymer of ethylene and said alkyl acrylate, that the copolymer is present in admixture with carbon black in a quantity of up to 20% by weight of the copolymer, and that the hydrolysis is effected by treatment of the molded product with alkali hydroxide.

10. A fuel cell comprising a pair of spaced electrodes in electrical contact with each other through the membraneous polyelectrolyte of claim 9 interposed between said electrodes, one of said electrodes being continuously maintained in contact with a fuel selected from the class consisting of hydrazine and hydrazine hydrate, while the other of said electrodes is being continuously maintained in contact with an oxidizing agent selected from the class consisting of hydrogen peroxide, reducible inorganic oxides and oxy acids and the alkali metal and the alkaline earth metal salts of said oxy acids.

11. A fuel cell comprising a pair of spaced electrodes of platinized platinum-rhodium alloy in electrical contact with each other through the membraneous polyelectrolyte of claim 9 interposed between said electrodes, one of said electrodes being continuously maintained in contact with hydrazine as fuel while the other said electrolyte is being continuously in contact with aqueous nitric acid as oxidizing agent.

12. A solid membraneous polyelectrolyte obtained by molding, at a temperature of from 50° C. to 200° C. and a pressure of 100 to 10,000 p.s.i. and in the presence of a peroxidic free radical-liberating agent a mixture of the two polymers:

(I) a copolymer of an aliphatic mono-olefinic hydrocarbon of from 2 to 4 carbon atoms with acrylonitrile or with an alkyl acrylate having from 1 to 4 carbon atoms in the alkyl, said copolymer consisting from 15% to 85% by weight of the mono-olefinic hydrocarbon, (II) a copolymer of said hydrocarbon and a vinyl alkanoate of from 4 to 6 carbon atoms, said copolymer consisting from 15% to 85% of the copolymerized hydrocarbon, wherein the quantity of the copolymer (I) is present in a quantity which is at least 50% of the total weight of (I) and (II) and the quantity of the peroxidic agent is from 0.5% to 15% by weight of said total weight, and subsequently hydrolyzing the resulting molded product.

13. A fuel cell comprising a pair of spaced electrodes in electrical contact with each other through the membraneous polyelectrolyte of claim 12 interposed between said electrodes.

14. A fuel cell comprising a pair of spaced electrodes in electrical contact with each other through the membraneous polyelectrolyte of claim 12 interposed between said electrodes, one of said electrodes being continuously maintained in contact with a fuel selected from the class consisting of hydrazine and hydrazine hydrate, while the other of said electrodes is being continuously maintained in contact with an oxidizing agent selected from the class consisting of hydrogen peroxide, reducible inorganic oxides and oxy acids and the alkali metal and the alkaline earth metal salts of said oxy acids.

15. The membraneous polyelectrolyte of claim 12, further limited in that copolymer (I) is the copolymer of ethylene and said alkyl acrylate.

16. The membraneous polyelectrolyte of claim 12, further limited in that copolymer (I) is the copolymer of ethylene and methyl acrylate and copolymer (II) is the copolymer of ethylene and vinyl acetate.

17. The membraneous polyelectrolyte of claim 12, further limited in that the two polymers are present in admixture with carbon black in a quantity of up to 20% of the total weight of the two polymers.

18. The membraneous polyelectrolyte of claim 12, further limited in that the hydrolysis is conducted by treatment of the molded product with alkali.

19. The membraneous polyelectrolyte of claim 12, further limited in that copolymer (I) is the copolymer of ethylene and methyl acrylate, that copolymer (II) is the copolymer of ethylene and vinyl acetate, that the two copolymers are present in admixture with carbon black in a quantity of up to 20% of the total weight of the two polymers and that the hydrolysis is conducted by treatment of the molded product with alkali hydroxide.

References Cited
UNITED STATES PATENTS

| | | | |
|---|---|---|---|
| 2,681,320 | 6/1954 | Bodamer | 260—2.2 |
| 2,831,045 | 4/1958 | Harding | 136—153 |
| 2,913,511 | 11/1959 | Grubb | 136—86 |
| 2,933,547 | 4/1960 | Grubb | 136—153 |
| 2,950,503 | 8/1960 | McRae | 260—2.2 |
| 2,972,170 | 2/1961 | Birckhead | 264—331 |
| 3,051,992 | 9/1962 | Bradley | 264—347 X |
| 3,089,897 | 5/1963 | Balmer | 260—86.7 |
| 3,198,776 | 8/1965 | Miller | 260—86.7 |

ALLEN B. CURTIS, *Primary Examiner.*

WINSTON A. DOUGLAS, *Examiner.*

H. FEELEY, *Assistant Examiner.*